Feb. 28, 1950     J. I. HELLER     2,498,919
DIRECTION INDICATING AND FINDING SYSTEM
Filed Feb. 15, 1946     2 Sheets—Sheet 2
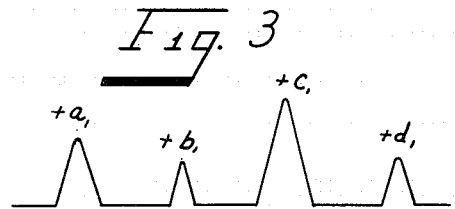
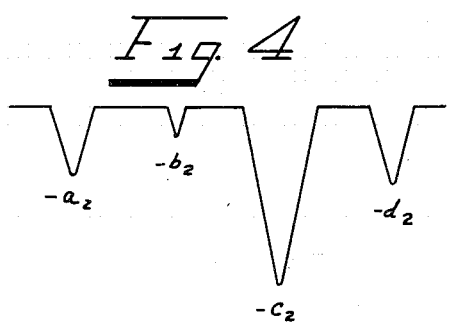
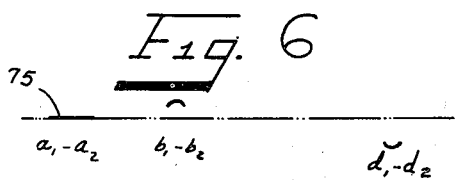
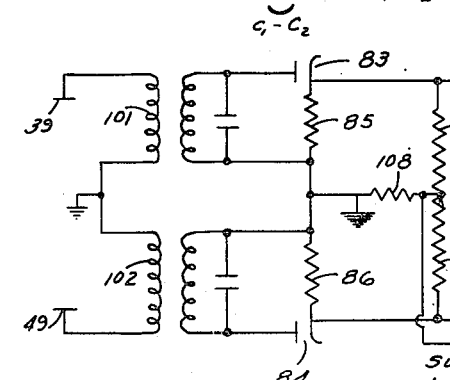
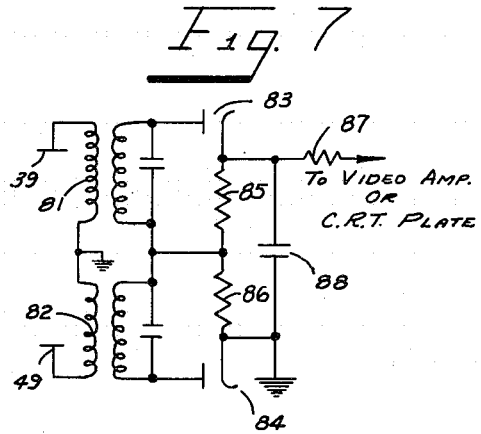
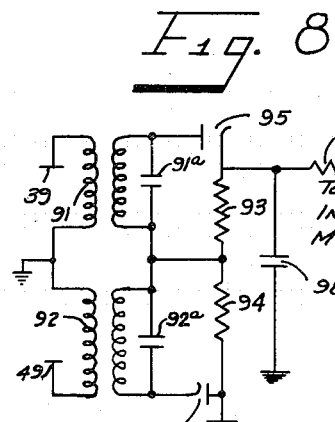
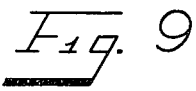
INVENTOR.
JOSEPH I. HELLER
BY
ATTORNEY Patented Feb. 28, 1950

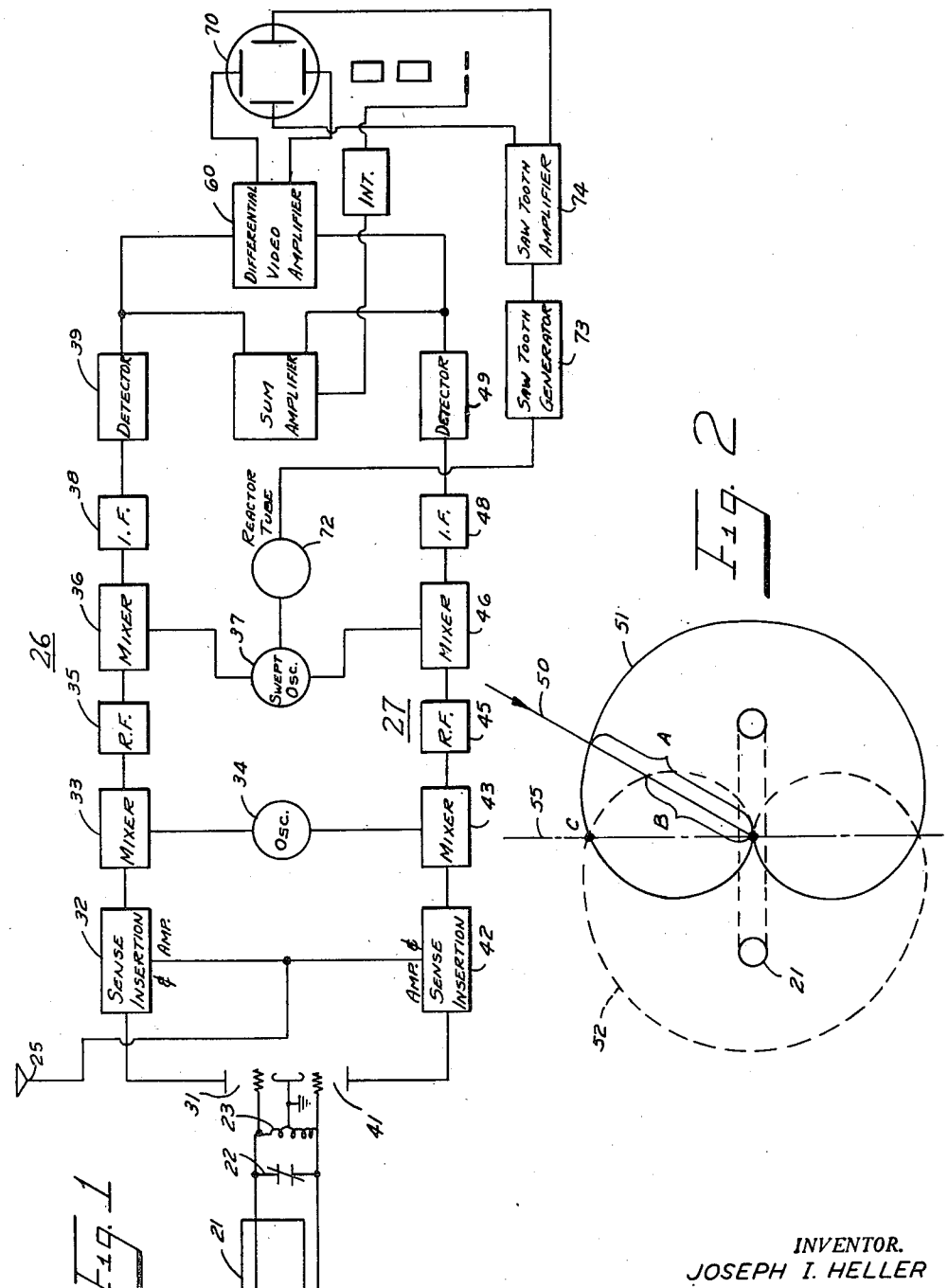

2,498,919

UNITED STATES PATENT OFFICE 2,498,919

DIRECTION INDICATING AND FINDING SYSTEM

Joseph I. Heller, Brooklyn, N. Y., assignor to Panoramic Radio Corporation, New York, N. Y., a corporation of New York Application February 15, 1946, Serial No. 647,863

19 Claims. (Cl. 343—113)

1

This invention relates to direction finding and indicating systems.

One of the objects of this invention is to provide a method and a system in which apparatus including a cathode ray tube is utilized to provide a continuous indication of the projected path of travel of a mobile craft carrying the apparatus, as the mobile craft moves with respect to a multiplicity of radio broadcasting stations.

In this invention certain principles are utilized of the loop type direction finder that is coupled with a vertical sense antenna to provide a cardioid-shaped directional response pattern, together with certain principles of the frequency-scanning receivers described in U. S. Patents Nos. 2,279,151 of April 7, 1942, to Marcel Wallace; 2,367,907 of January 23, 1945, to Marcel Wallace; 2,378,604 of June 19, 1945 to Marcel Wallace; and 2,381,940 of August 14, 1945 to Marcel Wallace, et al.

In the present invention certain features of those panoramic scanning systems and certain features of the loop type direction-finding system are combined in such manner as to eliminate the necessity for rotating the antenna loop in order to determine the bearing of any particular station to which the radio system on the craft is specifically tuned.

By means of the present method and system, the bearing of each broadcasting station is determined automatically and electronically without the necessity of rotating the loop antenna. The location of each broadcasting station with respect to the projected path of travel of the mobile craft is then indicated on the cathode ray oscilloscope by appropriate indicia relative to a reference line that corresponds to the projected path of travel of the craft. Each broadcasting station from which a signal is received is identified by a signal trace or index on the tube on the same side of the reference line on the tube as the station actually occupies relative to the projected path of the craft. The pilot is thus able to see, at a glance, the direction of movement of the craft with respect to all of the various stations that are identified on the cathode ray screen.

In order to enable the pilot to identify each of the broadcasting stations, the reference line on the cathode ray screen is calibrated in frequencies, and the individual stations whose broadcasting signals are received and detected are indicated in their appropriate positions on the reference line according to their respective frequencies in the frequency spectrum. Each traced index on the screen therefore indicates not only the frequency of a station, but also its actual position laterally with respect to the projected path of the craft. The reference line on the screen thus indicates the path of travel of the craft as it would be laid out on a map between the several stations whose signals are being received and shown on the cathode ray screen.

The operator thus has instantaneously and continuously, an indication of all of the broadcasting stations whose signals his radio equipment is receiving, the respective frequencies of those broadcasting stations, and the locations of those stations right or left relative to the instantaneous projected path of travel which the craft is then traversing.

Briefly the manner in which this system operates is to set up two cardioid directional response patterns which are 180° out of phase with each other, so that each broadcasting station can be received and a signal detected therefrom according to each of the two voltage response patterns. The two voltages thus received from each station are combined differentially to provide an instantaneous measurement showing which voltage response pattern is receiving the greater voltage. This information determines the location of the received broadcasting station as right or left with respect to the projected path of the craft. By such an arrangement a positive or a negative voltage indication is received which determines which voltage response pattern establishes the larger voltage, and thereby selectively determines whether the broadcasting station whose signal is being received is on the right-hand or on the left-hand side of the projected path of the craft. The signal is then traced or indicated on the display surface of the cathode ray screen depending on whether it is right or left, and thereby indicates the position of the broadcasting station.

The picture that is formed on the display screen of the cathode ray tube therefore shows a line representing the path of travel of the craft between several traced symbols which represent the stations and which are traced from the path-indicating line at distances corresponding to the actual distances, so that the pilot can see at a glance the actual direction of movement with respect to the stations and the respective bearing of the craft with respect to each of those stations.

The method of operation of the system may be fully appreciated upon reference to the accompanying drawings, in which Figure 1 is a schematic block diagram illustrating simply the functional elements that are combined for the desired operation;

Figure 2 is a simple illustration of a double cardioid pattern 180° out of phase as utilized in this system;

Figure 3 is a simple schematic view of a signal trace that would be formed on a cathode ray tube as derived from the detector output of the circuit for one directional cardioid pattern;

Figure 4 is a simple schematic trace that would be simultaneously received from the detector output of the circuit for the second directional cardioid pattern;

Figure 5 is a schematic showing of a trace that would be formed as a difference between the traces in Figures 3 and 4, and represents the differential output of the two detectors, which is then impressed upon the cathode ray screen as an indication of the received signals according to their direction and strength;

Figure 6 is a simplified showing of the manner in which the signals are intensified or emphasized so that only the maximum values of the signal traces are shown on the cathode ray screen;

Figure 7 is a simple diagram of the output circuit of the equipment whereby the two directional signals from the two cardioid patterns are combined to provide a single signal to be supplied to the cathode ray tube;

Figure 8 is a similar simple diagram of the output circuit showing the manner in which an intensifying voltage is obtained to control the cathode ray tube to provide an intensified signal such as in Figure 6;

Figure 9 is a simple diagram showing the manner in which a circuit is arranged to provide the features of Figures 7 and 8 in a single circuit to establish the voltage for the cathode ray tube to cause the signal trace and to establish the proper intensification to show only the maximum values of the signal traces.

As shown in Figure 1, the system comprises briefly a loop 21, an adjustable condenser 22, and an inductance 23. The loop feeds simultaneously but at 180 degree phase displacement into each of two panoramic scanning channels 26 and 27, from which the outputs are combined to provide the desired information as a voltage, which is then applied to the cathode ray screen to indicate the information obtained by the system. The normal figure-8 directional pattern of the loop 21 is converted into a double cardioid response pattern as shown in Figure 2 by means of a sense-inserted voltage derived from a vertical antenna 25. There the sense-insertion of the voltage from the vertical antenna 25 is introduced into both channels at an appropriate point to cause the two cardioid directional patterns to be established 180° out of phase.

Each channel is intended to be similar to the other and to have equal circuit constants so far as is possible. Each channel is indicated briefly as consisting of a radio frequency section including the tube illustrated as a triode 31 plus one or more amplifying and sense insertion tubes shown at 32. The output of tube 32 is supplied to a mixer 33 which is also arranged to be controlled by an oscillator 34 to permit manual adjustment of the system for a purpose to be described later.

The resulting output from the mixer 33 is supplied to an intermediate radio frequency amplifier section 35 whose output is fed to a second mixer 36, which is also arranged to be controlled by a swept oscillator 37 to establish an intermediate frequency output at the mixer 36, which is then supplied to an intermediate frequency amplifier section 38, there amplified, and then supplied to a detector 39.

The output of the detector 39 of channel 26 is combined with the output of the similar detector in the other channel 27 to provide the voltages which effect indications of the information desired.

The second channel 27 shown at the lower part of the diagram of Fig. 1 has similar sections and elements to those identified and shown in the top channel, and those sections and elements of channel 27 are correspondingly numbered in the series of numerals from 41 to 49, inclusive. Both channels are commonly fed by the sense antenna 25 as shown. Both channels are also controlled by the manually tunable oscillator 34 by means of which the channels 26 and 27 may be manually tuned to any desired frequency within the range of the receiving equipment, either to centralize the band whose frequencies are being scanned, or to permit aural indications of that tuned frequency.

Both channels are similarly controlled by the swept oscillator 37 so that the same frequencies are transmitted through the two channels simultaneously, although as signals of opposite polarities.

Intermediate frequency stages 38 and 48 are therefore energized by the same respective frequencies, and the two detectors 39 and 49 also operate upon the same frequencies. Each detector detects the signals arriving at the loop and provides an individual cardioid directional response voltage, according to the effect of the signal from each station on the antenna array.

As may be seen upon reference to Figure 2, in which the two cardioid patterns 51 and 52 are shown, a signal wave 50 approaching the stationary loop 21 strikes the two sides of the loop to establish two voltages, that combine with the voltage of the sense antenna 25 to create in channels 26 and 27 two voltage signals whose values correspond, respectively, to the length of vector A from the origin to the right-hand pattern 51, and to the length of vector B from the origin or center of the indicated loop to the left-hand cardioid pattern 52. The two voltages set up in the two channels will be of different values according to the direction of the signal toward the stationary loop 21, and the values of those voltages will be represented by the distances from the center of the loop to the points at which the signal direction line cuts the equivalent cardioid patterns as loci. The two signal voltages that are now the outputs of the detectors 39 and 49 correspond in value to the two voltages A and B, since the two channels are substantially similar and have the same constants and amplifying power.

In the present system the directional loop 21 need not be rotated and is kept stationary with the plane of the loop perpendicular to the normal direction or center space line of the craft upon which it is supported. That center line is shown as the line 55 in Figure 2, perpendicular to the plane of the loop. It is obvious from consideration of Figure 2, that any signal approaching the loop from the right-hand side will establish a voltage such as the voltage A, according to the right-hand cardioid pattern 51, which will be greater than the voltage B set up according to the left-hand cardioid pattern 52. If the two voltages A and B are then subtracted always in the same direction, that is the voltage of pattern 51 minus the voltage of pattern 52, the polarity of the difference will indicate the direction of approach of the signal wave 50. Assuming the pattern 51 to be designated positive and the pattern 52 to be designated negative, A minus B will provide a positive value for a signal approaching from the right, as signal 50 is shown. If the signal were to approach from the opposite side of the center line 55, the voltage set up on the response pattern 52 would exceed that on the response pattern 51 and the difference being subtracted in the same way, the value of the voltage of pattern 51 minus the value of the voltage of pattern 52 will provide a negative polarity difference.

The difference of the two pattern response voltages, such as voltage A minus voltage B is determined in a differential video amplifier 60, shown in schematic in Figure 1, and the polarity of such difference output is determined by the relative values of the voltages A and B. Such differential value of voltage is applied to one pair of deflecting electrodes of a cathode ray tube 70. The polarity of that voltage will control the direction of the deflection of a reference trace on the tube display surface and will thus indicate whether the voltage A minus B is positive or negative. This will correspond to an indication showing whether the incoming signal 50 is on the right-hand side or on the left-hand side of the longitudinal axis 55 of the coil 21 which is also the instantaneous direction of travel of the craft.

The scanning action of the two channels 26 and 27 is controlled in a manner as illustrated and described in the patents referred to above, by means of a frequency-controlling element such as a reactance tube 72, whose reactance is controlled by a sawtooth generator 73.

The sawtooth generator 73 also controls an amplifier 74 which supplies a periodic sawtooth sweep voltage to the horizontal electrodes of the cathode ray tube. In the arrangement as shown in Fig. 1, the deflecting electrodes of the cathode ray tube 70 are energized so that the reference line is horizontal, and the deflections, according to their respective polarities, are shown as traces above and below the reference line. If it is desired to have the reference line vertical, to correspond to the direction of the travel of the craft, the vertical electrodes may be energized to establish the reference baseline and the horizontal electrodes will then be energized from video differential amplifier 60 in accordance with the differential output of the two channels to provide the positive or negative deflection of the trace, which would now be right-hand or left-hand relative to the vertical reference line.

The operation of this system may be more generally understood by considering the nature of the signals that would be shown by the cathode ray tube in the absence of the differential amplifier 60. If the output signal of the top channel 26, alone, were impressed directly upon the tube, a trace, for example, as shown in Figure 3, might be indicated. The pips would represent the signals received by one side of the loop and the sense antenna on cardioid response pattern 51, for example, from several broadcasting stations whose frequencies were within a band centered on the frequency to which the receiver is tuned at the moment. The positions of the signals along the frequency calibrated reference line would correspond to the frequencies of the respective stations from which the signals emanated, and the heights would indicate intensity or signal strength.

In similar fashion if the lower channel only were connected, so that the output of the channel would energize the vertical electrodes of the cathode ray tube, a trace such as shown in Figure 4 would be indicated. The pips on the trace would again represent the frequency of various stations from which the signals were being received, and the duration of reception and strength of each signal voltage as received on the loop 21, in accordance with the cardioid response pattern 52.

By differentially combining the effects of the two channels 26 and 27, indicated by the two response pattern traces of Figs. 3 and 4, a difference pattern trace is established corresponding to the trace pattern shown in Figure 5, which represents, at each signal indication, the difference between the voltage from the cardioid response pattern 51 and the voltage from the response pattern 52, or the difference between voltages A and B.

As described up to this point, the trace that would be shown on the cathode ray screen would be such as is illustrated in Figure 5.

In a modified circuit arrangement, the baseline portion of the trace is eliminated so that only the actual difference values between paired signals will be indicated, thereby emphasizing the indication of the location of the signal source with respect to the center reference line. To accomplish that, the control grid of the cathode ray tube is arranged to be energized in such manner as to suppress the cathode ray beam, and the spot that would be formed thereby on the cathode ray screen, so long as no signal impulse is being received by the two channels. Upon the reception, however, of signal impulses with corresponding output from the detectors, those two impulses will be combined and will then be applied to the control grid to establish an intensification of the cathode ray beam, which will then form the trace on the screen, corresponding to such signals only, and a resulting indication would be such as is shown in Figure 6. Only the individual signal traces are shown on the side of the reference line corresponding to the direction from which the signal wave approaches the direction-finding loop 21.

Coming back for a moment to Figure 2, it will be seen that when a wave, such as the wave 50, would approach the loop 21 in a direction parallel to the center line 55, both sides of the loop would be equally energized, and the two voltages A and B established according to the two patterns 51 and 52, would be equal since they would both correspond to the voltages which would be set up at the point c where the two patterns intersect. The difference between the corresponding voltage effects as obtained at the outputs of the two detectors 39 and 49, would be zero, and no indication would be shown as a deflection on the cathode ray screen. By utilizing the sum of the two detector output voltages to control the intensifier grid, the cathode ray beam may be controlled to establish a trace along the locus that would normally be occupied by the reference line, as shown, for example, as the trace 75 in Figure 6.

Thus, reconsidering the two traces in Figures 3, 4, 5 and 6, it will be seen that the positive deviation as indicated as $+a$, $+b$, $+c$ and $+d$ in Figure 3, are units of the pairs of corresponding frequency signals whose negative voltage effects are indicated by $-a$, $-b$, $-c$ and $-d$ in Fig. 4. The positive and the negative voltage effects are respectively derived from the two detector outputs, according to the two voltage patterns 51 and 52. The respective differences between each plus signal effect and each corresponding paired minus signal effect, as, for example, the difference between $+a$ and $-a$, of the two signal effects shown in Figure 3 and Figure 4, are indicated by the signals shown in Figures 5 and 6. In the case of $a_1$ and $a_2$, the two signal effects are equal, indicating that the wave is approaching the loop 21 directly from the front, parallel to the center line 55, and the difference between those two signal effects is therefore zero. In the case of the small B signal, the positive voltage response is greater than the negative voltage response, leaving a positive difference as indicated in Figure 5 and Figure 6, which shows that the station from which the B signal emanates is located to the positive, or right-hand, side of the center line 55, representing the instantaneous path of travel of the craft carrying the equipment.

The manner in which the difference and sum voltages are derived from the detected signal outputs from detectors 39 and 49, in order to be properly applied to the cathode ray tube 70, may now be considered upon reference to Figures 7, 8 and 9, inclusive.

In Fig. 7, detectors 39 and 49 are shown feeding their outputs into transformers 81 and 82, respectively. The secondaries of the transformers 81 and 82 feed through two detectors 83 and 84 into a circuit containing two resistors 85 and 86, as shown. Since the two detectors are feeding in opposition into their output circuits, the voltages through rectifiers 83 and 84 will be impressed in opposition across resistors 85 and 86. The potential difference, therefore, between the two outer ends of resistors 85 and 86, represents a difference or subtraction of the voltages across the two resistors, and thus serves to provide the differential voltage effect desired for the vertical deflection plates of the cathode ray tube 70. That differential voltage may be applied to the cathode ray tube either directly through a resistor 87 or through an additional video amplifier.

In Fig. 8 is shown a circuit by which the two output voltages may be additively combine. Detectors 39 and 49 feed their outputs into two transformers 91 and 92 and the secondaries are connected in series circuit relation to energize two resistors 93 and 94, through two rectifiers 95 and 96 that are now connected in series relation instead of in opposition, as was the case in Figure 7. Each of secondary condensers 91a or 92a substantially maintains the secondary voltage across itself, while the voltage across the other secondary becomes and remains of the proper polarity to render its associated rectifier conductive to energize its load resistor. The voltage drops across the two resistors 93 and 94 are then additive, and the combined voltage drop or potential difference across the two resistors may now be amplified or supplied directly to the control electrode of the cathode ray tube to intensify the beam.

Figure 9 illustrates a simple circuit by which both the sum and difference voltages may be obtained in one circuit. As shown in Figure 9, the detectors 39 and 49 feed their outputs into two transformers 101 and 102, whose outputs are connected, as in Figure 7, through two rectifiers 83 and 84, in opposition, to two resistors 85 and 86 in series. The voltage from the rectifier 83 is also supplied to an auxiliary circuit including a resistor 107 and a resistor 108. Similarly, the output of the rectifier 84 is connected to a resistor 109 and the resistor 108. The resistor 108 is thus energized by the current from the rectifier 83 and also by the current from the rectifier 84 so that the drop across resistor 108 is a function of the sum of the two voltages transmitted by the rectifiers 83 and 84.

The potential difference between the outer terminals of the resistors 85 and 86 are in opposition and represents the difference between the two voltage drops across resistors 107 and 109, respectively. At the same time the drop across resistor 108 represents a function of the sum of the two voltages transmitted by the two rectifiers 83 and 84, and provides a voltage which may be utilized to control an intensity amplifier for the control grid of the cathode ray tube 70, or to energize the grid directly.

As previously mentioned the first mixer 33 is controlled by oscillator 34 which is manually adjustable. Adjustment of this oscillator serves to tune the RF stage of each channel so an audio device if connected through an audio stage to the first mixer would be energized by the signals from the station to which the RF stage is tuned, as is explained in detail in the prior patents previously referred to. The station to which the RF stage is tuned by such adjustment of the oscillator 34 is in each instance the center frequency at the moment on the display screen, and the frequency band that is swept by the swept oscillator 37 is centered about the frequency to which the RF stage is tuned.

Therefore, if it is desired to tune the equipment to a station corresponding to any one of the traces on the cathode ray screen, that may be done by adjusting the oscillator 34 to shift that signal trace to the center of the display screen.

Although for the sake of simplicity and by way of example, I have illustrated and described the use of a loop and sense antenna combination, and a receiver of the double superheterodyne type, my invention is not limited to such an antenna system nor to a receiver of that type, since a receiver of any type may be used with any antenna which provides a directional voltage pattern.

Similarly although I have described one of the specific uses and advantages in connection with a mobile craft, the invention is not so limited and any reference to "mobile craft" in the description or claims is not to be taken as a limitation, since the invention has utility for stationary uses in locating broadcasting stations.

While the cardioid patterns have been shown displaced by 180 degrees, that relationship may be varied and the two associated receiver circuits adjusted according to the angular relationship arbitrarily adopted.

My invention is therefore not limited to the specific arrangements or details shown since they may be variously modified without departing from the spirit and scope of the invention as set forth in the appended claims.

I claim:

1. A panoramic direction finder comprising a loop and vertical antenna assembly to provide two cardioid direction pattern voltages 180° out of phase; means for feeding each cardioid voltage separately to each of two panoramic receiver channels, each channel including two conversion stages in sequence; a common first oscillator to simultaneously control the first conversion stage of both channels; a common second oscillator to simultaneously control the second conversion stage of both channels; means including a source of saw-tooth voltage for sweeping a frequency band of the second oscillator; means combining the outputs of the two channels; a cathode ray tube having a display surface and first and second ray deflecting elements; and means supplying the combined output of the two channels to one deflecting element, and the saw-tooth voltage to the other deflecting element.

2. A panoramic direction finder as in claim 1, together with means for applying to the control grid of the cathode ray tube a voltage proportional to the sum of the output voltages from both channels.

3. A panoramic direction finder comprising an antenna system for establishing two 180° phased cardioid direction pattern voltages from a signal received from a broadcasting station; a superheterodyne receiver circuit fed from each cardioid voltage source, each receiver circuit comprising a wide band-pass input stage, a first conversion stage, a first intermediate frequency stage, a second conversion stage and a second intermediate frequency stage; a common first oscillator for simultaneously tuning both circuits at the first conversion stage; a common second oscillator for simultaneously controlling both circuits at the second conversion stage; means including a sawtooth generator for sweeping the second oscillator; means for differentially detecting the output of the two circuits; a cathode ray tube having a display surface and first and second deflecting elements; means supplying the saw-tooth generator voltage to the first elements; and means supplying the differential detector output to the second deflector elements.

4. A panoramic radio compass comprising an antenna system arranged to provide two cardioid directional pattern voltages 180° out of phase; a wide-band receiver circuit fed from each voltage and including a detector in its final stage; means simultaneously sweeping the frequency bands in both receiver circuits; a timing circuit, a cathode ray tube having vertical and horizontal deflecting electrodes; means controlled by the timing circuit to energize one set of deflecting electrodes; means also controlled by the timing circuit to control the sweeping means; and means for subtracting the output voltages of the detectors and supplying such resultant output voltage difference to the other set of deflecting electrodes.

5. A radio compass as in claim 4, in which the cathode ray tube is provided with a control grid normally biased to suppress the cathode ray beam; and means responsive to the sum of the output voltages of the detectors to overcome the bias and cause intensification of the cathode ray beam.

6. A panoramic direction finder for a mobile craft to simultaneously identify and locate operating broadcasting stations along the line of travel of the craft, comprising a fixed directional antenna system; a cathode ray tube; and electronic means comprising a pair of frequency scanning receivers connected between the antenna system and the tube and operative to energize the tube to show (1) the frequencies of the received signals from the broadcasting stations that are adjacent the travel line of the craft; and (2) the directional location of those stations relative to the line of travel.

7. A panoramic direction finder for a mobile craft to locate operating wave energy transmitters along the line of travel of the craft, comprising a fixed directional antenna system, including a loop and a sense contributing means; a cathode ray tube; and means including a double channel panoramic receiver for frequency scanning regions on both sides of the line of travel, detecting signals from said transmitters and supplying the detected signals to the tube, to show the signals on the tube display surface in spaced relationship according to the frequencies of the transmitters and according to the bearings of the craft relative to each of said transmitters.

8. A panoramic direction finder for a mobile craft to simultaneously identify and locate operating broadcasting stations along the line of travel of the craft, comprising a fixed directional antenna system; a cathode ray tube; a first panoramic receiver circuit energized by the antenna system to scan the frequency spectrum to identify and locate broadcasting stations on one side of the line of travel; a second panoramic receiver circuit energized by the antenna system to scan the frequency spectrum to identify and locate broadcasting stations on the other side of the line of travel of the craft; and means energized from both receiver circuits to energize the cathode ray tube to display spaced indicia along a frequency calibrated base line according to the frequencies of the respective stations; and spaced laterally from the base line according to the bearing of the corresponding station relative to the craft.

9. The method of operating a radio direction finder system on a mobile craft to ascertain and show the direction of travel of the craft, which consists in scanning a selected band of the frequency spectrum to locate the signals being broadcast within that band by stations within a determinable range of reception of the craft along the projected path of travel of the craft; detecting the signals from the respective stations with relation to two cardioid directional patterns 180° out of phase; combining the signal effects of each station, as received with relation to the two out-of-phase patterns, to determine which pattern effect is greater; establishing a frequency calibrated reference line on a cathode ray tube screen to represent the projected path of travel of the craft; and tracing signal-identifying indicia on the screen on one side or the other of the reference line, according to which pattern signal effect is greater, thereby showing the bearing, relative to the projected path of travel, of the station from which each signal emanates, the position of each signal-identifying index being disposed longitudinally along the reference line according to the broadcasting frequency of the station from which the signal emanates.

10. A panoramic direction finder comprising receiving antenna means for providing a pair of substantially cardioid energy patterns in respectively opposite phase relation, a separate receiver means energized by each of the cardioid patterns, each circuit comprising at least one frequency conversion stage, said conversion stages each comprising the same tunable oscillator, means for periodically varying the tuning of said oscillator to vary correspondingly the frequencies receivable by said receiver means, a cathode ray tube indicator means having ray scanning elements and a screen for visual presentation of positions of said ray, means for energizing said ray scanning elements for sweeping said ray across said screen in synchronism with the tuning variations of said oscillator to establish a frequency calibratable time base, means for combining the outputs of said receiver means, and means for applying to said scanning elements signals derived from said combining means and having amplitudes which are a differential function of the outputs of said receiver means whereby to indicate on said screen the direction from which received signals arrive at said antenna means.

11. A system for finding the position and direction of movement of a mobile craft relative to one or more sources of broadcast energy, which comprises, an antenna system providing two cardioid radiation patterns, first and second signal transfer channels for transferring signals contained in said first and second radiation patterns and intercepted by said antenna system in respectively opposite phases, each of said first and second signal transfer channels comprising a first and a second frequency conversion stage, a common local oscillator connected to said first conversion stages, a frequency scanning oscillator connected to said second conversion stages, a saw-tooth generator for controlling frequency scanning of said frequency scanning oscillator, means for combining output signals derived from said first and second signal transfer channels to obtain a voltage which is a function of both said output signals, a cathode ray tube indicator having first and second deflection electrodes, means for applying said voltage to said first deflection electrodes, and means for applying a saw-tooth voltage derived from said saw-tooth generator to said second deflection electrodes.

12. The combination in accordance with claim 11 wherein said cathode ray tube indicator is provided with an intensity control grid, and wherein is provided means for applying intensifying voltage to said intensity control grid in response to said output signals.

13. A panoramic direction finder comprising wave energy receiving antennae for providing two differently directed reception patterns, a visual indicator, first and second frequency scanning wave energy detectors coupled to said antennae for respectively detecting wave energy received by said antennae and contained in said respective reception patterns, means for differentially combining signal output derivable from said wave energy detectors in response to detection of wave energy thereby during frequency scanning thereof, a visual indicator having visual indication means movable in two coordinate directions, means for moving said visual indication means in a first of said two coordinate directions in synchronism with said frequency scanning, and means for moving said visual indication means in a second of said two coordinate directions in response to said means for differentially combining signal output.

14. A panoramic direction finder comprising, first tunable wave energy receiving means, second tunable wave energy receiving means, said first and second wave energy receiving means comprising means for synchronously varying the tuning of said first and second tunable wave energy receiving means, said first and second tunable wave energy receiving means comprising wave energy intercept means having two different directivities, a cathode ray tube indicator having means for generating and deflecting a cathode ray beam in two directions, means for deflecting said cathode ray beam in one of said two directions in synchronism with said tuning, and means for deflecting said cathode ray beam in the other of said two directions in accordance with the difference of amplitudes of wave energies substantially simultaneously received by said first and second wave energy receiving means.

15. The combination in accordance with claim 14 wherein said wave energy intercept means comprises a loop antenna and an omni-directional sense antenna, and means responsive to said loop antenna and said omni-directional sense antenna for providing a pair of cardioid intercept patterns of differently phased energy content.

16. The combination in accordance with claim 14 wherein is further provided means for further simultaneously identically tuning said wave energy receiving means.

17. The combination in accordance with claim 14 wherein said means for synchronously varying the tuning of said first and second tunable wave energy receiving means comprises means for periodically varying said tuning over a predetermined frequency spectrum.

18. The combination in accordance with claim 14 wherein said cathode ray tube comprises a beam intensity control means, and wherein said beam intensity control means is responsive to the sum of amplitudes of wave energies substantially simultaneously received by said first and second wave energy receiving means.

19. A panoramic direction finder for simultaneously indicating the bearing and frequency of each of a plurality of sources of wave energy signals, comprising, a cathode ray tube indicator having means for generating a cathode ray beam, means for deflecting said beam in a first direction, means for deflecting said beam in opposite senses in a second direction, a wave intercept system comprising means for establishing two discrete wave intercept patterns on both sides of a reference line, a first panoramic frequency scanning receiver for examining the frequencies of said signals and the bearings of said sources as established by one of said wave intercept patterns, a second panoramic frequency scanning receiver for examining the frequency of said signals and the bearings of said sources as established by the other of said wave intercept patterns, means for applying deflecting signal to said means for deflecting said beam in said first direction in correspondence with the frequency scanning of said panoramic receivers, means for applying deflecting signal to said means for deflecting said beam in a first of said opposite senses in said second direction in response to one of said panoramic receivers and in the other of said opposite senses in said second direction in response to the other of said panoramic receivers.

JOSEPH I. HELLER.

REFERENCES CITED

The following references are of record in the file of this patent:

UNITED STATES PATENTS

| Number | Name | Date |
|---|---|---|
| 1,839,290 | Bailey | Jan. 5, 1932 |
| 2,214,342 | Neufeld | Sept. 10, 1940 |
| 2,279,246 | Podliasky et al. | Apr. 7, 1942 |
| 2,408,039 | Busignies | Sept. 24, 1946 |